United States Patent

[11] 3,576,198

[72] Inventor Jean Jacques Bessot
 Arpajon, France
[21] Appl. No. 740,267
[22] Filed June 26, 1968
[45] Patented Apr. 27, 1971
[73] Assignee Societe Anonyme: Societe Alsacienne De Constructions Atomiques De Telecommunications Et D'Electronique Alcatel, Paris, France
[32] Priority June 27, 1967
[33] France
[31] 112.125

[54] GREAT-DIAMETER VALVE FOR ULTRAHIGH VACUUM
 4 Claims, 7 Drawing Figs.
[52] U.S. Cl. .................................................. 137/375, 251/175, 251/326
[51] Int. Cl. ........................................... F16k 27/12, F16k 3/02
[50] Field of Search.......................................... 62/55.5; 233/11, 13; 137/334, 340, 375; 251/159, 172, 174, 175, 326, 328

[56] References Cited
UNITED STATES PATENTS

| | | | |
|---|---|---|---|
| 2,900,165 | 8/1959 | Badger et al. | 251/172 |
| 3,145,969 | 8/1964 | Von Zweck | 251/172 |
| 3,170,478 | 2/1965 | Bryant | 137/340 |
| 3,347,453 | 10/1967 | Goergen | 233/11 |
| 3,391,862 | 7/1968 | Jacobson et al. | 233/13 |

FOREIGN PATENTS

| 1,310,817 | 10/1962 | France | 251/172 |
|---|---|---|---|

Primary Examiner—Henry T. Klinksiek
Attorney—Littlepage, Quaintance, Wray & Aisenberg ABSTRACT: The valve includes a valve member of great diameter provided with an elastomer seal and borne by a carriage allowing its translational motion during the valve-opening or closing movements. An insulating chamber provided within the valve case houses the valve member when the valve is open. A metal bellows is caused by pneumatic jacks to engage the valve member, when the valve is closed. In the open condition, said chamber ensures thermal insulation of the valve member and protects the seal thereof during heating at high temperature of the ultrahigh vacuum vessel components.

Jean Jacques Bessot

BY Littlepage, Quaintance + Wray
Attys.

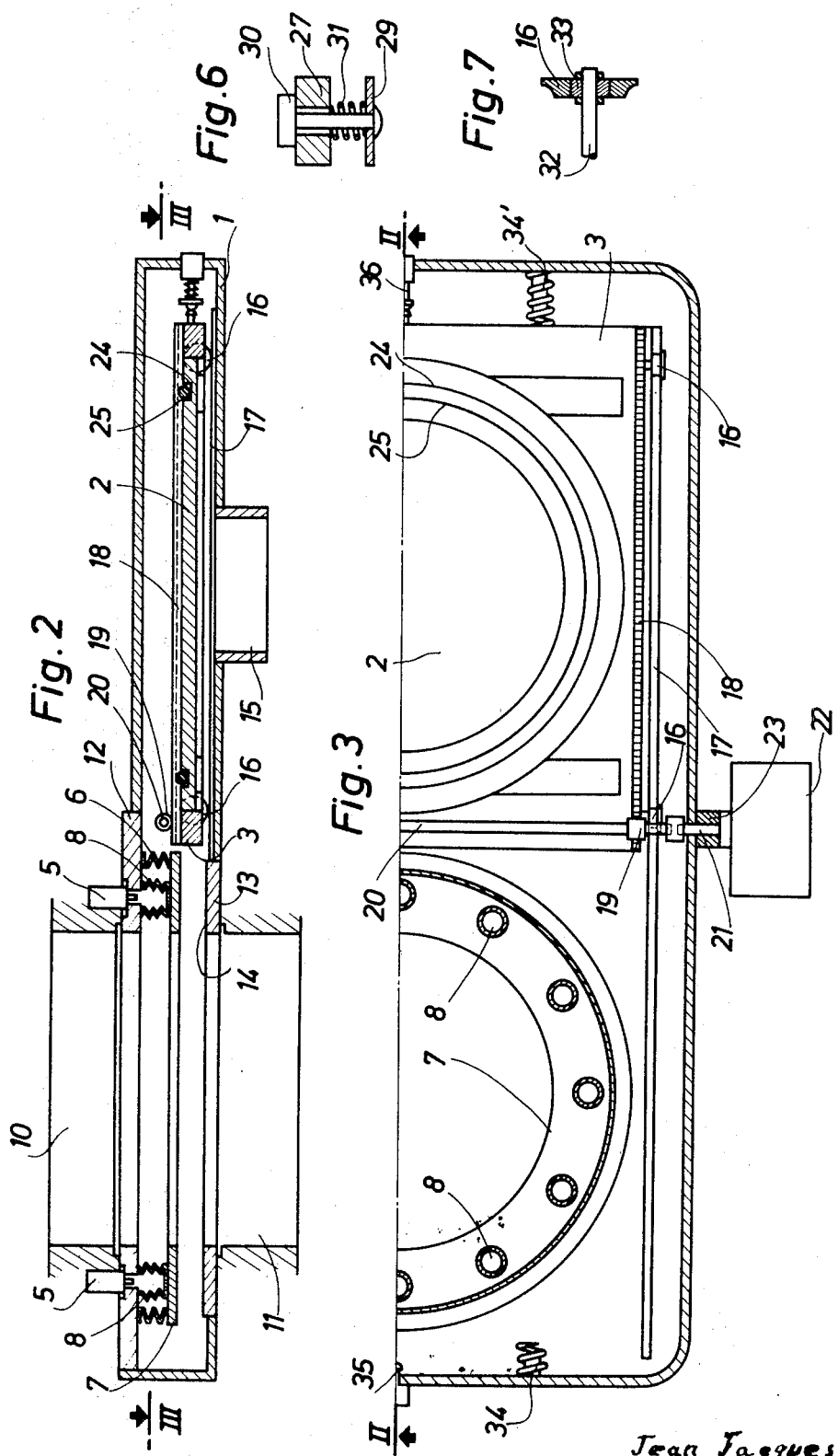

GREAT-DIAMETER VALVE FOR ULTRAHIGH VACUUM

The present invention relates to a great-diameter valve for ultrahigh vacuum, especially of the slide-valve type.

In the known types of slide valves for ultrahigh vacuum, the opening and closing of a duct are accomplished by a translational movement imparted to a valve member along its own plane. Fluidtightness between the valve member and seat is ensured by a seal, either of elastomer or of metal.

Such ultra-vacuum valves have a number of drawbacks.

In particular, the use of elastomer seals as sealing means for ultravacuum valves causes contamination of the vessels to be evacuated, with the risk of prejudicial effect on the correct operation of the whole device.

Moreover, thermal instability of elastomeric materials prohibits the use thereof in vessels at temperatures of several hundreds of Celsius degrees; therefore, such materials cannot be used in ultrahigh vacuum valves liable to be subjected to such temperatures.

On the other hand, the use of metal seals or gaskets does not provide real, reproducible fluidtightness when the port to be sealed is of very great diameter (e.g. greater than 150 mm.). As a result, the seals have to be frequently replaced, this involving repetitive time-consuming shutdown of the whole system and entailing high maintenance costs.

The purpose of the invention is to remedy these drawbacks by permitting the use of an elastomer seal adapted to ensure reliable fluidtightness. Contamination of the vessel under ultrahigh vacuum is prevented by axial retraction of the seal during the valve-opening movement. Destruction of the seal is avoided by thermal insulation thereof during heat application.

According to the invention, there is provided a slide valve for ultrahigh vacuum which may be heated to temperatures of several hundreds of Celsius degrees, and which are adapted to seal ports of substantial diameter. The valve comprises a valve member of substantial diameter provided with an elastomer seal; a carriage for the valve member; rail-engaging guide means allowing translational motion of the valve member during the valve-opening or closing movement; an insulation vessel adapted to accommodate said valve member when the valve is open and a metal bellows operated by means of pneumatic jacks. The insulation chamber and said metal bellows cooperate together, when the valve is open, to effect thermal insulation of the valve member and to protect the elastomer seal thereof while the components of the ultravacuum vessel are heated to high temperatures.

Said valve member is mounted on said carriage through springs coacting with said metal bellows to press said valve member against a movable flange carried by said bellows.

Said movable flange of the bellows is acted upon by said pneumatic jacks through small metal bellows spaced around the annular surface of the flange.

The stroke of said carriage is limited at each end of the case by resilient stops.

Electric contacts operated by said carriage at each end of its stroke act to stop the carriage-driving electric motor. The carriage motor drives a shaft which has pinions in mesh with two racks secured to said carriage and extending parallel to two guide rails thereof.

The invention is more fully described hereinunder, with reference to the appended drawings, wherein:

FIG. 2 shows one embodiment of the valve, in sectional view along line II–II of FIG. 3;

FIG. 3 is a half-sectional view of the valve along line III–III of FIG. 2;

FIG. 6 is a sectional view showing the mounting of the valve member on the carriage;

FIG. 7 is a sectional view of one carriage wheel.

Figure 1:
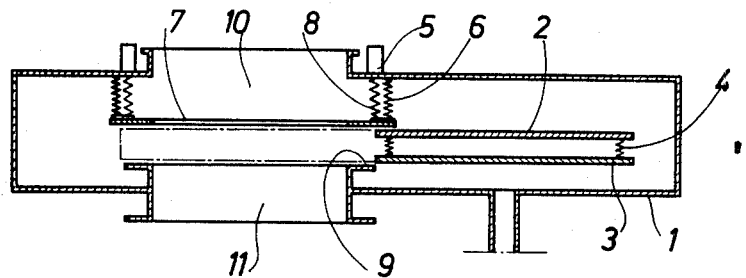
FIG. 1 is a diagrammatic layout of the valve structure and operation.

As shown in FIG. 1, the valve includes an insulation chamber consisting of a flat case 1 adapted to fully protect the valve member or slide 2 when the valve is in its opened position, as shown in full line in said FIG.

Case 1 is provided with rails (not shown) for guiding said slide and is permanently maintained under a vacuum of some $10^{16}$ torr, both to insulate the ultrahigh vacuum components from the atmosphere and to ensure comparative thermal insulation of the slide.

Slide 2 is provided on its lower side with a sealing surface adapted to provided fluidtightness between the pump unit and the case interior. The upper side of slide 2 is equipped with an elastomer seal for ensuring fluidtightness between the case and the vessel which is under ultrahigh vacuum, when the latter is subjected to atmospheric pressure while the case is held under the aforesaid pressure of $10^{16}$ torr.

A carriage 3 is driven by a rack device and guided by rails (not shown) arranged within the case on both sides of the valve seat. The carriage carries the slide on springs 4 and imparts to said slide a translational motion normally to the axis of the ultrahigh vacuum duct.

A pneumatic jack set 5 coats with a bellows 6, fast with a movable flange 7, through small fluidtight bellows 8, to provide space for axial movement of the slide and to ensure continuity of the ultravacuum duct. The set of pneumatic jacks 5 can be located either inside bellows 6 (ultravacuum side) or outside bellows 6 (insulating vacuum side).

The basic operation of the valve according to the invention is as follows:

The valve is open when carriage 3 and slide 2 are in the position shown in full line in FIG. 1. The valve closing movement is effected by imparting to the slide 2 a translational motion normal to the duct axis moving the slide to the position shown in broken lines. An axial movement of slide 2 into closed engagement with the valve seat 9 is effected by means of the pneumatic jack set 5 cooperating with bellows 6 and movable flange 7. Then, atmospheric pressure may be restored within the vessel at 10 without stopping the ultrahigh vacuum pump at 11.

Conversely, the valve-opening movement can be effected as follows:

After preevacuation of the ultrahigh vacuum vessel 10, slide 2 is moved apart valve seat 9 through a release of the pneumatic jack device and a concurrent expansion of the springs securing the slide to its driving carriage. Then, the slide and its carriage are returned within case 1 by a translational motion similar, but of opposite direction to that used for closing the valve, while the continuity of the ultrahigh vacuum duct is ensured by bellows 6 and movable flange 7, which is brought against the valve seat 9 by means of the pneumatic jack system. Then, ultrahigh vacuum may be established within vessel 10 by simultaneous operation of pump 11 and heating of the various components of the ultrahigh vacuum ducting.

Such a valve for ultrahigh vacuum affords a number of advantages:

One advantage lies in the fact that, due to the primary vacuum within the case, the ultrahigh vacuum components can be heated without risk of impairment of the slide elastomer seal.

Another advantage results from the fact that the elastomer seal used to effect strict, reproducible fluidtightness between the ultrahigh vacuum vessel and the case is at no time in contact with the ultrahigh vacuum components, so that it cannot contaminate them; therefore, atmospheric pressure can be restored within the vessel without stopping the ultrahigh vacuum pumps. Still a further advantage lies in the fact that the possibility of using an elastomer seal as a sealing means in an ultrahigh vacuum valve liable to be heated to temperatures of several hundreds of Celsius degrees allows for efficient reproducible sealing of ultrahigh vacuum ducts having substantial rated diameters, e.g. greater than 150 mm.

FIGS. 2 and 3 show one embodiment of the present valve, by way of example implying no limitation.

Said valve comprises essentially a box-shaped case 1 acting as an insulating chamber for a closing valve member or slide 2 made of stainless steel, carried by a carriage 3.

Case 1, also made of stainless steel, is connected to the ultrahigh vacuum vessel 10 by means of a first flange 12, and to the ultrahigh vacuum pump unit 11 through a second flange 13, having a mechanically finished upper face 17 which forms the valve seat. Moreover, case 1 is connected with an auxiliary vacuum pump through a duct 15.

The slide-driving carriage 3 is also made of stainless steel and is carried by wheels 16 rolling along rails 17 which are secured to the bottom of case 1, on either side of valve seat 14. The carriage movement is controlled through two racks 18 in meshing engagement with two pinions 19 which are made of ceramics and are fast with a driving shaft 20, coupled to the shaft 21 of an electric motor 22. Said motor is external to case 1 and shaft 21 extends through the case wall by means of a vacuum crossover device 23.

Connecting flange 12 has secured thereon the metal bellows 6 which is made of stainless steel and is also fast with the movable flange 7, adapted to be acted upon by 12 pneumatic jacks 5 cooperating with small fluidtight bellows 8.

Figure 4:
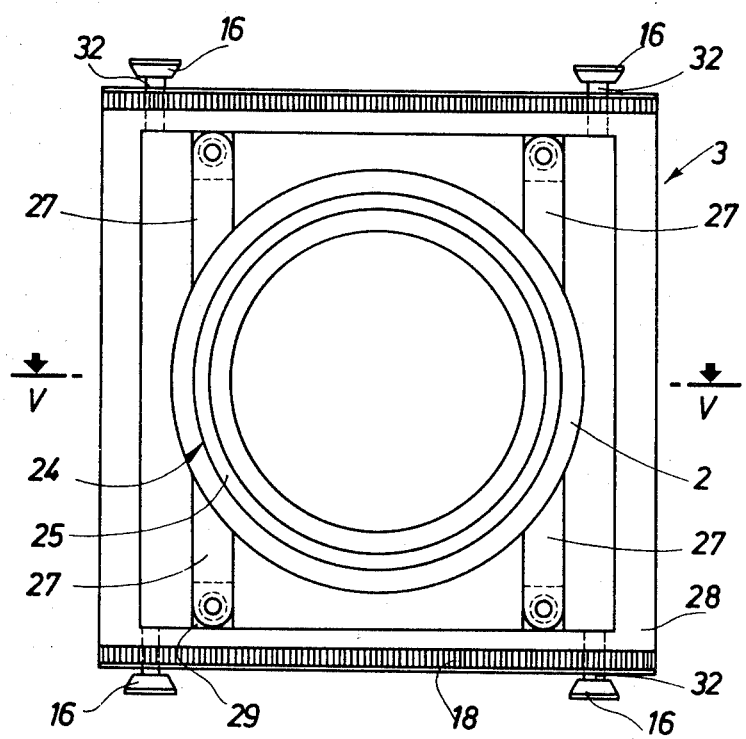
FIG. 4 is a top plan view of the carriage and valve member.
Figure 5:
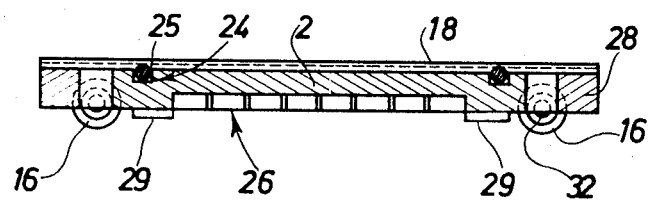
FIG. 5 is a section along line V–V of FIG. 4.

FIGS. 4 and 5 show a particular embodiment of the slide 2 and carriage 3.

In this embodiment, slide 2 consists of a circular stainless steel plate provided with ribs at its lower portion. Said plate has in its upper portion a circular groove 24 intended to accommodate an elastomer O-ring or seal 25. The elastomer material forming said seal can be, for instance, a copolymer of fluorovinylidene and fluoropropylene such as Viton. The plate moreover has at its lower portion, opposite to the valve seat, a sealing surface 26 with a mechanical finish. Said surface finish is effected by lathe lapping to avoid the possible formation of radial streaks. The slide is provided with four lugs 27 for securing it to the driving carriage.

The driving carriage consists of a metal frame 28 of a thickness scarcely different from that of slide 2. This frame has secured thereon the two driving racks 18. The carriage is movable in translation by means of four wheels 16 and is provided with four legs such as 29 for securing the slide.

As shown in FIG. 6, the slide is mounted on the carriage through four studs such as 30 and four springs such as 31 surrounding the studs, the latter being fixed to the carriage legs 29 and adapted to slide with some clearance through holes pierced in the slide lugs 27.

The wheels 16 (FIG. 7) are preferably of the railway wheel type, each rotating about a pin 32 borne by the carriage, by means of a bearing 33 made of alumina.

Arranged within case 1 (FIG. 3) are four spring-urged stops 34, 34' damping the carriage movement at the stroke ends and two electric contacts 35, 36 which cut off the electric motor 22 at said stroke ends.

The operation of the thus constructed valve is as follows:

The valve-closing movement is effected as follows:

The insulation case 1 being under a vacuum of $10^{15}$ to $10^{16}$ torr, maintained by means of the auxiliary pump unit connected to duct 15, slide 2 fast with its driving carriage 3 is brought over valve seat 13 by simultaneous action of racks 18, pinions 19, driving shaft 20 and electric motor 22, the carriage being guided by rails 17 during this movement. At the end of its stroke, carriage 3 abuts against stops 34 and operates contact 35 which arrests motor 22. Slide 2 is then pressed against valve seat 14 by means of the pneumatic jacks 5 which coact with the small fluidtight bellows 8 to firmly repel movable flange 7, which is fixed to metal bellows 6, against slide 2, thereby insulating the ultrahigh vacuum vessel from pump unit 11 by the action of the elastomer seal on the lower face of ring 7.

Conversely, the valve opening movement is effected as follows:

Metal bellows 6 and movable flange 7 are taken apart from slide 2 by release of the pneumatic jack set 5 coacting with the small fluidtight bellows 8. Slide 2 is then raised from valve seat 14 by concurrent expansion of the four springs 31 which connect the slide with its carriage 3, and slide 2 and carriage 3 are then returned within case 1 by the combined action of racks 18, pinions 19 of driving shaft 20 and electric motor 22. The continuity of the ultrahigh vacuum duct is then ensured by pressing movable flange 7 of metal bellows 6 against valve seat 14 by means of the pneumatic jack set 5 coacting with the small fluidtight bellows 8.

Moreover, the carriage movement within insulating case 1 is limited by the spring-urged stops 34' and stopped at the same time by contact 36 which cuts off electric motor 22.

There is thus provided satisfactory connection between the pump unit and ultrahigh vacuum vessel. The engagement between the lower machined side of the movable flange and the valve seat suffices to ensure fluidtightness between the ultrahigh vacuum vessel, at a pressure of some $10^{110}$ torr, and the insulating vessel, which is maintained at $10^{16}$ torr, due to the molecular vacuum on both sides of the seal. On the other hand, the metal bellows contributes to the thermal insulation of the slide and of its elastomer seal, thus allowing for a thermal degassing throughout the vessel under ultrahigh vacuum.

It will be understood that structural and detail modifications may be brought to the valve described above by way of nonrestrictive example, without departing from the scope of the invention.

I claim:

1. Valve apparatus for sealing a duct comprising: a first duct portion, a valve seat connected to one end of a first duct portion, a valve member, translating means connected to the valve seat and to the valve member for positioning the valve member on the valve seat and for withdrawing the valve member therefrom, a second duct portion having an end opposite and spaced from the valve seat, a continuous extensible wall having a first edge sealed around said end of the second duct, a flat ring connected around an edge of the extensible wall remote from the second duct, extension means connected to the ring and to the second duct for extending the wall and pressing the ring toward the valve seat and for withdrawing the ring from the valve seat, whereby the ring may be withdrawn when the valve member is moved toward or away from the valve seat, and whereby the ring may be pressed against the valve seat to complete joining of the duct portions by the extensible wall and to thereby isolate the valve member from the duct when the valve member is in withdrawn position, and whereby the ring may be pressed against the valve member when the valve member is positioned on the valve seat, a vacuum chamber case surrounding the valve seat, said end of the second duct portion, the extensible wall, and the valve member in tightly sealed relationship, and a source of vacuum connected to the case for evacuating the case independently of the duct portions, whereby when the valve member is withdrawn from the valve seat, the ring member may be pressed tightly against the valve seat, and the case may be evacuated for thermally insulating the valve member from the duct portions and for surrounding the juxtaposed ring and valve seat with low pressure within the case.

2. The valve apparatus of claim 1 further comprising parallel trucks mounted in the case, rollers mounted on the track and a valve-member carriage connected to the rollers, and springs on the carriage supporting the valve member whereby the carriage positions the valve member over the valve seat and the ring presses the valve member on the valve seat against force of the carriage mounted springs.

3. The valve apparatus of claim 1 wherein the extension means comprise a plurality of relatively small bellows interconnecting the ring and the second duct and a pneumatic supply system for extending and contracting the plurality of bellows, and wherein the extensible wall comprises a large circular bellows extending between an outer edge of the ring and a flange extended outward from said end of the second duct.

4. The valve apparatus of claim 1 wherein the valve member has a circular groove in a surface thereof adjacent the ring, an elastomeric O-ring disposed in the groove and extending beyond the surface of the valve member for sealing said end of the second duct when the ring is pressed against the valve member.